May 19, 1964  C. HONSEL  3,133,478

METHOD OF AND MACHINE FOR MANUFACTURE OF BLOCK BOTTOM BAGS

Filed Nov. 3, 1961  6 Sheets-Sheet 1

Inventor:
CARL HONSEL
BY Robert H. Jacob
AGT.

May 19, 1964 C. HONSEL 3,133,478
METHOD OF AND MACHINE FOR MANUFACTURE OF BLOCK BOTTOM BAGS
Filed Nov. 3, 1961 6 Sheets-Sheet 2

Inventor:
CARL HONSEL
BY Robert K. Jacob
AGT

Fig.6

May 19, 1964   C. HONSEL   3,133,478
METHOD OF AND MACHINE FOR MANUFACTURE OF BLOCK BOTTOM BAGS
Filed Nov. 3, 1961   6 Sheets-Sheet 4

Inventor:
CARL HONSEL
BY Robert K. Jacob
AGT.

May 19, 1964  C. HONSEL  3,133,478
METHOD OF AND MACHINE FOR MANUFACTURE OF BLOCK BOTTOM BAGS
Filed Nov. 3, 1961

Inventor:
CARL HONSEL

May 19, 1964     C. HONSEL     3,133,478
METHOD OF AND MACHINE FOR MANUFACTURE OF BLOCK BOTTOM BAGS
Filed Nov. 3, 1961

Inventor:
CARL HONSEL

United States Patent Office 3,133,478
Patented May 19, 1964

3,133,478
METHOD OF AND MACHINE FOR MANUFACTURE OF BLOCK BOTTOM BAGS
Carl Honsel, Bielefeld, Germany, assignor, by certificate of inheritance and assignment to Karl-Heinz Honsel
Filed Nov. 3, 1961, Ser. No. 149,989
Claims priority, application Germany Nov. 5, 1960
10 Claims. (Cl. 93—8)

The invention relates to paper bags and is particularly concerned with bags of the type having a block bottom.

The manufacture of bags with block bottoms such as known heretofore is rendered difficult by the fact that the tools for placing and sealing the block bottom are comparatively complicated. The operation of placing and sealing the block bottom with the complicated tools requisite for this purpose limits the output capacity of a machine which is correspondingly low.

Now, in order to achieve economic production of bags with block bottoms, it is an object of the present invention to provide the bag with a seamless bottom surface and the longitudinal edges of the bag with internally located lateral folds, each sealed by means of a longitudinal adhesive seam. By virtue of the fact that the actual block bottom is of seamless construction, the tools hitherto requisite for placing and sealing the block bottom are eliminated.

The present invention provides a method wherein the length of material to be severed from a roll or web is, before being severed, provided at both longitudinal edges with a cut, with a longitudinal fold as well as with an adhesive. The blank prepared in this manner is then fed into the bottom folding station of the machine. In order to form a seamless bottom, three transverse folding operations are performed by the machine in a manner that the direction of bend of the first fold is opposite in direction to the subsequent transverse fold. After that the length of material is folded into the shape of a Z, including the two said transverse folds, and then two lateral surfaces of the bag are finally superimposed by means of a third transverse fold.

The invention also provides a machine wherein the bottom folding station comprises three folding-blade and folding-gripper cylinders arranged one behind the other, and wherein the folding-blade and the folding-gripper of the first pair of cylinders is arranged oppositely to the folding-blades and folding-grippers of the two following pairs of cylinders. A device for imparting a backward movement to the leading part of a workpiece cooperates with the second pair of cylinders and in every case only one pair of cylinders is adapted to act upon the workpiece at one time.

This method and the associated machine according to the invention are of particular advantage because they allow employment of revolving tools exclusively to form the bottom of the block bottom bag, which may for example also be constructed as a carrying or shopping bag, and this results in that an especially high output capacity of the machine can be obtained, particularly since in accordance with the invention no fingers with pressure devices to be introduced into the region of the web of material are necessary.

The folding of the block bottom into the shape of a Z with subsequent superimposing of the two lateral surfaces of the bag may be performed in different ways within the scope of the invention. It is possible, for example, to follow a procedure whereby the transverse fold to be formed last is brought into coincidence with respect to its folded edge after the step of forming the Z-shaped fold. The method may also be performed in a manner such that the transverse fold to be formed last is located in advance of the preceding fold at an interval corresponding to twice the width of the Z-shaped fold, after the step of forming the Z-shaped fold. Finally, it is also conceivable to perform the method, for example, in the manner that the Z-shaped fold is placed in the leading position and the last transverse fold is located ahead of the first transverse fold by twice the width of the Z-shaped fold.

With reference to the machine required to perform the said methods, reference has already been made to the fact that a device is to be coordinated with the second pair of cylinders which imparts a backward motion to the leading portion of the workpiece. To this end, the second folding blade cylinder may be provided with an air suction mechanism which cooperates with a deflecting device.

The machine for manufacturing the bags with seamless block bottoms may also be so constructed that the bottom folding station again consists of three folding-blade and folding-gripper cylinders disposed one behind another, but wherein the folding-blade and the folding-gripper of the second pair of cylinders are arranged in the opposite sense to the folding blades and folding grippers of the first and third pairs of cylinders. In this case a device is arranged behind the second pair of cylinders which retards the leading portion of the workpiece until the step of folding the Z-shaped fold by means of a revolving segment has been concluded. This retarding device may consist of a suction channel arranged in a fixed position beneath the workpiece, and a revolving segment is coordinated with the said suction channel which is located above the suction channel.

In the case of the machine arrangements described heretofore, three folding-blade and folding-gripper cylinders were disposed one behind another in the direction of feed of the web of material, which, in combination, constitute the bottom folding station. However, the overall length of the machine may be shortened as compared with these arrangements, if the bottom folding station consists of one operating cylinder, along the periphery of which three folding-blade or folding-gripper cylinders are provided. The coordination of the folding-blade with the folding-gripper intermediate the individual auxiliary cylinders associated with the main cylinder may be provided in the opposite sense, in the same manner as described above.

The method and apparatus for carrying the invention into practice will become more apparent from the following description with reference to the drawings which illustrate different embodiments of the inventive concept and in which.

The blank for a bag with seamless block bottom to be manufactured according to the invention consists of the length 1 cut from the web of material, which is provided at its two longitudinal edges with the lateral fold portions 2 and 3 which are to be turned over. The said blank consists of the two lateral surfaces $a$ and $b$ of the bag, and in the embodiment of the blank according to FIGURE 1 the lateral surface $a$ of the bag is further provided with gluing folds 5 and 6. The adjacent lengths $a$ and $b$ in the continuous web are indicated in FIG. 1 at both ends of the length 1 of material web by broken lines.

Figure 1:
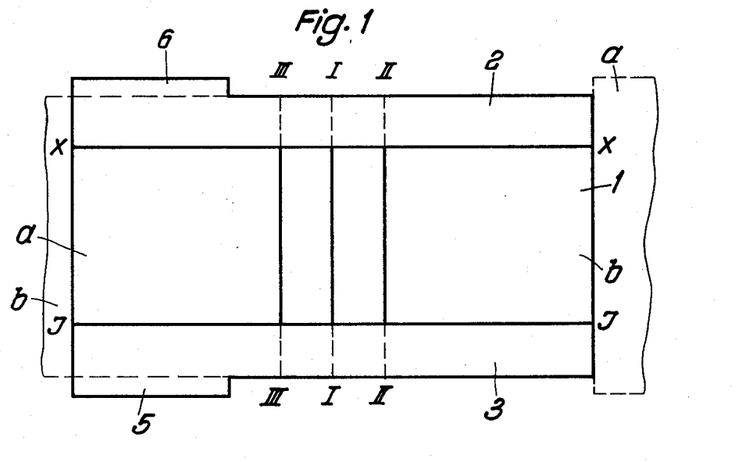
FIGURE 1 shows a blank of a bag with seamless block bottom.
Figure 2:
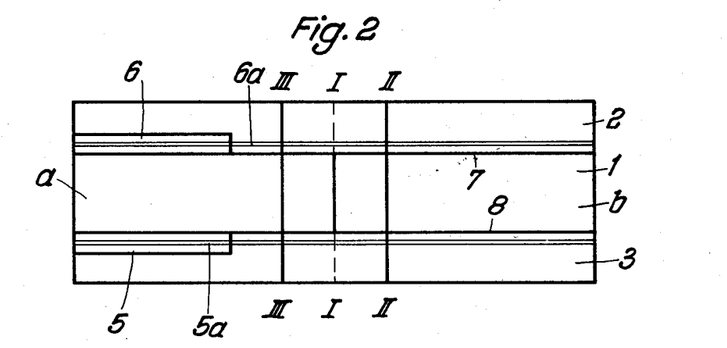
FIGURE 2 shows the blank according to FIGURE 1 after the longitudinal edge of the bag has been folded over inwardly and the longitudinal gluing seams of one side of the bag have been folded back in opposite directions and the said blank thus folded has been provided with longitudinal adhesive strips.

The blank according to FIGURE 1 is cut from the web of material coming from the roll by means known for this purpose. Then, as is further known, a folding-over of the lateral fold parts 2 and 3 about the lines of folds of $x$—$x$ and $y$—$y$ in FIGURE 1 is performed by means of appropriate longitudinal folding devices, and finally, again with longitudinal folding devices, an opposite folding-over of the adhesive folds 5 and 6 along the external longitudinal edges 7 and 8 of the blank according to FIGURE 1 is performed. After the said longitudinal folds have been formed on the web of material, the adhesive folds 5 and 6 and the turned-back lateral fold parts 2 and 3 are provided with covering adhesive strips 5a and 6a. After the web of material has been prepared in this manner, the length as can be seen in FIGURE 2 is severed from the web of material.

The blank of material is now fed to the bottom folding station. To this end, three transverse folds, the lines of fold of which are designated by the numerals I, II and III in FIGURES 1 and 2, are applied to the continuously transported blank of material or workpiece. With the aid of the three transverse folds, a W-shaped folding of the seamless block bottom of the bag is achieved. The completely glued block bottom bag is shown in side elevation in FIGURE 3, with its lateral surfaces $a$ and $b$, with the block bottom K and with the associated transverse folds I, II, III. The numeral 9 indicates the longitudinal adhesive seam between the two parts $a$ and $b$ of the bag. The lateral fold parts are in turn designated by the numerals 2 and 3.

Figure 4:
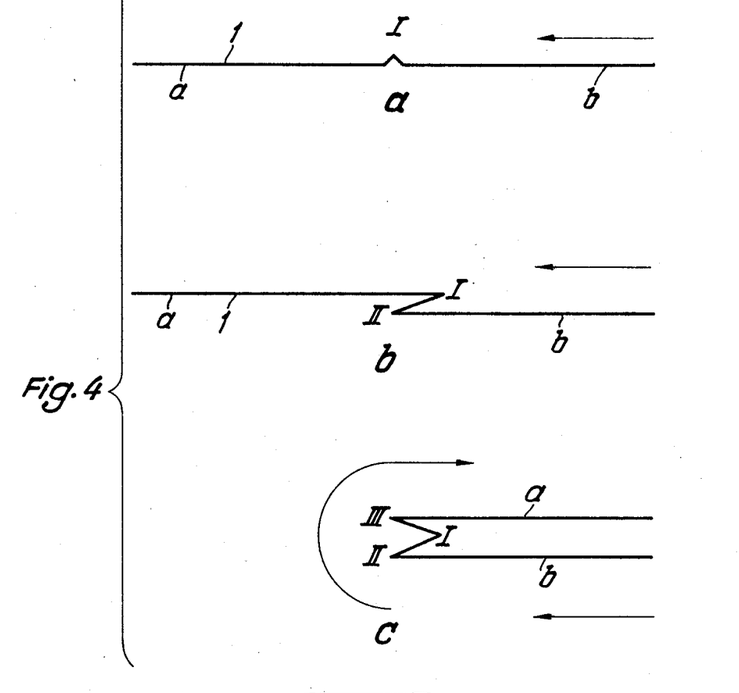
FIGURE 4 is a diagrammatic representation of the folding process in the three stages a, b, c.

A better understanding of the various folding processes which can be performed by means of the transverse folds already referred to will be obtained with reference to the operative process according to FIGURE 4, which is completed in the manner that the workpiece 1 is first provided with a central transverse fold I, as shown in FIGURE 4a. Then, according to FIGURE 4b, the second transverse fold is made, while simultaneously a folding occurs, namely at an interval between the fold I and the fold II which corresponds to one half the width of the bottom. After the blank 1 has been brought to the form according to FIGURE 4b, the third fold III is effected, so that, as indicated by the curved arrow in FIGURE 4c, the lateral surface $a$ of the bag is superimposed upon the lateral surface $b$ of the bag.

Figure 5:
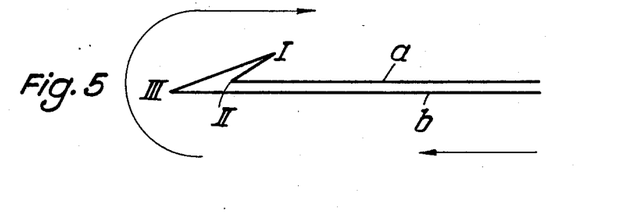
FIGURE 5 is a diagrammatic representation of a folding process modified with respect to FIGURE 4.

In the case of the folding process according to FIGURE 5, the transverse folds I and II according to FIGURE 4a and FIGURE 4b are first applied, but displaced by a half-width of bottom in part $a$. The folding process III is accomplished, in the case of the folding process according to FIGURE 5, in the manner that the interval between the folded edge I and the folded edge III is equal to the full width of the bag bottom. After the said folding process III according to FIGURE 5 has been performed, the lateral surfaces $a$ and $b$ of the bag are again superimposed, as is also indicated in FIGURE 5 by a curved arrow.

Figure 6:
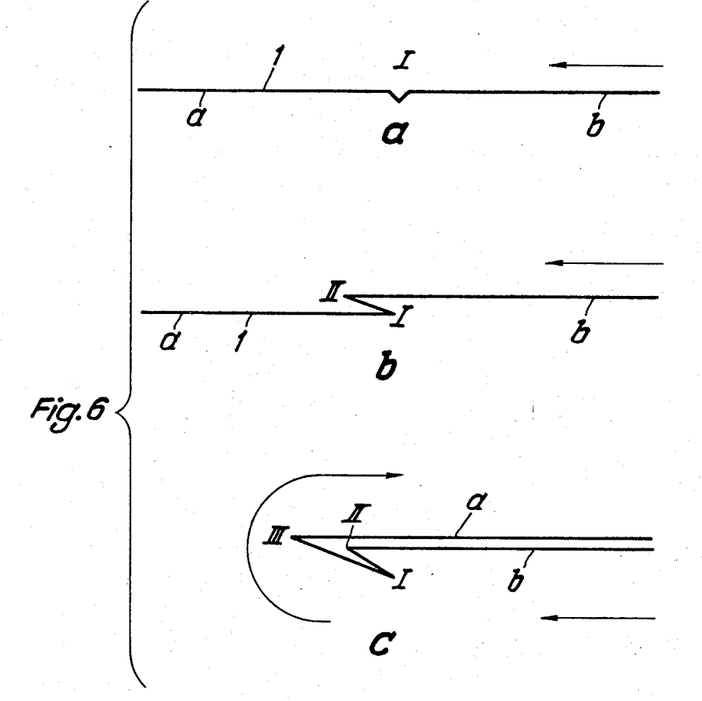
FIGURE 6 is a diagrammatic representation of a third possibility of folding the stages a, b, c.

The further possibility of folding according to FIGURE 6 is similar to the possibility of folding according to FIGURE 4, with the difference that the second folding process II is performed ahead of the first folding process I. The third folding is then effected at an interval from the fold I which again corresponds to the full width of the bottom, and the lateral surface $a$ of the bag is again superimposed upon the lateral surface $b$ of the bag according to the curved arrow drawn in FIGURE 6c. FIGURE 6a shows the application of the first transverse fold I. FIGURE 6b shows how the transverse fold II has been performed ahead of the transverse fold I.

Figure 7:
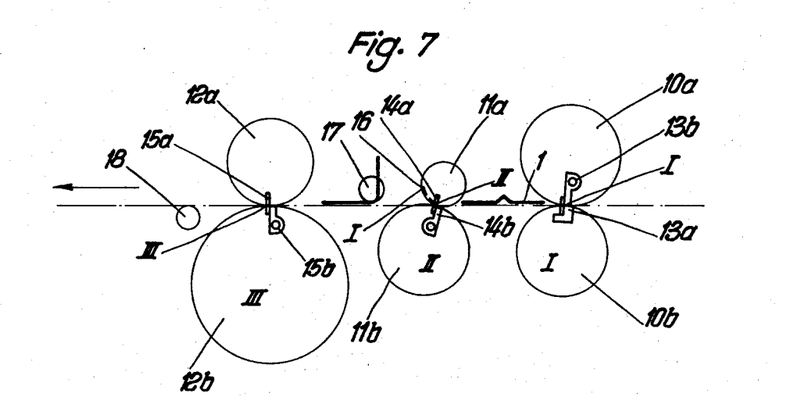
FIGURE 7 is a diagrammatic representation of a bottom folding station consisting of three folding-blade and folding-gripper cylinders arranged one behind another.

FIGURE 7 shows, diagrammatically, first of all an embodiment of the bottom folding station. The said bottom folding station consists of three pairs of folding-blade and folding-gripper cylinders connected one behind another: 10a, 10b, 11a and 11b and 12a and 12b. The folding-blade and folding-gripper pair 10a, 10b serves to produce the transverse fold I, the folding-blade and folding-gripper pair 11a, 11b to produce transverse fold II, and the folding-blade and folding-gripper pair 12a, 12b to produce the transverse fold III.

In the case of the folding-blade and folding-gripper pair 10a, 10b the cylinder 10b is equipped with the folding-blade 13a, and the cylinder 10a with the folding-gripper 13b. By contrast, the cylinder 11a carries the folding-blade 14a, whereas cylinder 11b is provided with the gripper 14b, and finally the cylinder 12a is again equipped with a folding-blade 15a and the cylinder 12b with a folding-gripper 15b.

Figure 8:
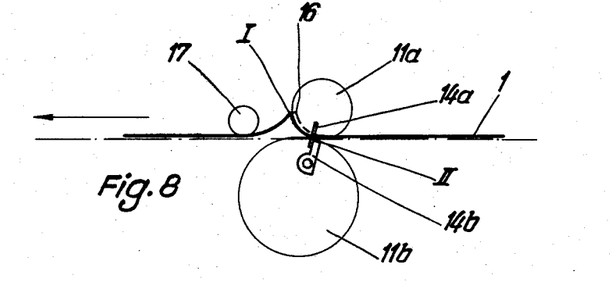
FIGURE 8 and FIGURE 9 are detailed illustrations of the central folding-blade and folding-gripper cylinder according to FIGURE 7, in two successive stages of operation.
Figure 9:
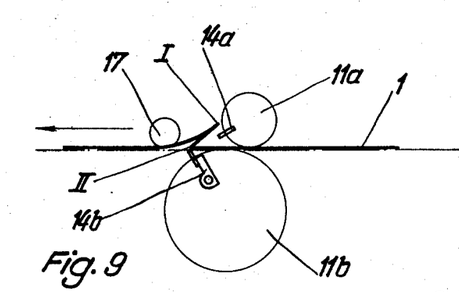

The blank is passed through the individual folding-blade and folding-gripper cylinders in the direction of the arrow drawn in FIGURE 7, i.e., from right to left. Meanwhile, the first transverse fold I is formed according to FIGURE 4a by means of the pair of folding-blade and folding-gripper cylinders 10a, 10b. The blank 1 then travels to the folding-blade and folding-gripper cylinders 11a, 11b. The folding-blade cylinder 11a is provided additionally with an air suction mechanism 16. The blank is drawn with the folded edge I around the cylinder 11a by means of the air suction mechanism 16, and is drawn upwards in accordance with the rotation of the cylinder, so that the second transverse fold II may then be formed by means of the folding-blade 14a and of the folding gripper 14b. The drawing up of the blank by means of suction with simultaneous formation of the transverse fold II is made especially clear in FIGURE 8. The numeral 17 designates a further deflecting roller. In cooperation with the said deflecting roller, and after the transverse fold I has been raised and the said transverse fold has been torn away from the air suction mechanism 16, the Z-shaped folding of the workpiece 1 is accomplished, as shown in FIGURE 9.

Figure 3:
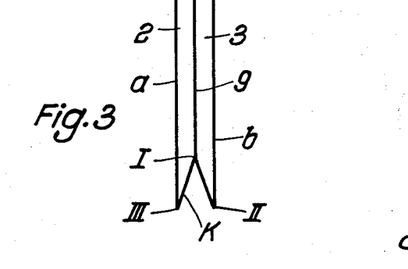
FIGURE 3 is a side elevation of the block bottom bag manufactured with the blank according to FIGURES 1 and 2.
Figure 10:
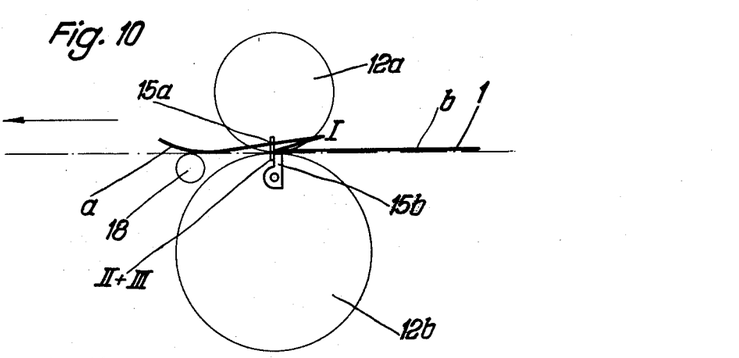
FIGURE 10 is the last folding-blade and folding-gripper cylinder according to FIGURE 7 for effecting the folding process according to FIGURE 4c.

The pair of cylinders 12a, 12b is again separately illustrated in FIGURE 10, which is intended to show how the transverse fold III is now also brought about by the said pair of cylinders by means of the folding-blade 15a and of the folding-gripper 15b. This fold, which is formed by means of the folding-gripper 15b and of the folding-blade 15a, embraces the two transverse folds II and III, so that after the lateral surface *a* of the bag has been turned over, the finished bag according to FIGURE 3 is produced.

FIGURE 11 again shows the third pair of folding-blade and fold-gripper cylinders 12*a* and 12*b* in a somewhat varied form of construction from that shown in FIGURE 10, inasmuch as the blank 1 after having been provided with the Z-shaped fold according to FIGURE 4*b*, advances and receives its third fold III in the manner that the said third fold is located at an interval from the transverse fold II corresponding to the full width of the bottom, according to FIGURE 5.

Figure 11:
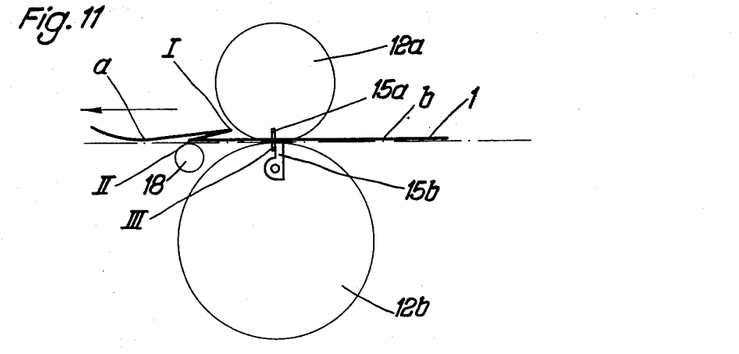
FIGURE 11 is the last folding-blade and folding-gripper cylinder according to FIGURE 7 for effecting the folding process according to FIGURE 5.

In order to enable the turning back of the lateral surface *a* of the bag onto the lateral surface *b* of the bag, also a deflector 18 is provided as shown in FIGURES 10 and 11. The same deflector 18 is also shown in FIGURE 7.

Figure 12:
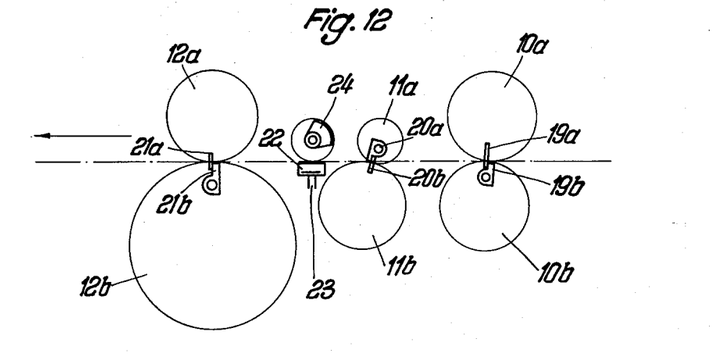
FIGURE 12 is a diagrammatic representation of a construction of a bottom-folding station, modified with respect to FIGURE 7.
Figure 13:
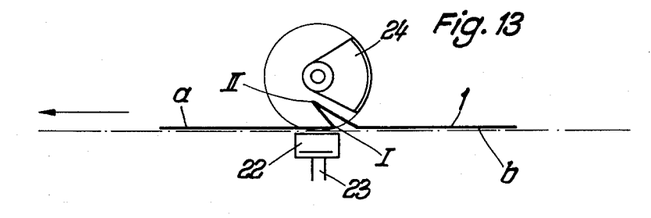
FIGURE 13 is the retarding and folding device according to FIGURE 12, drawn to an enlarged scale.

The bottom folding station according to FIGURES 12 and 13 differs from the bottom folding station according to FIGURE 7 in that the cylinder 10*a* is provided not with a folding-gripper, but with a folding-blade 19*a*, while the cylinder 10*b* is provided with a folding-gripper 19*b*. The cylinder 11*a* on the other hand has a gripper 20*a*, while the cylinder 11*b* has a folding-blade 20*b*. Finally, the cylinder 12*a* is again provided with a folding-blade 21*a* and the cylinder 12*b* with a folding-gripper 21*b*.

In the bottom folding station according to FIGURES 12 and 13, the central pair of cylinders 11*a* and 11*b* is not provided with an air suction device, but an air suction channel 22 having a suction conduit 23 and a revolving segment 24 is arranged in sequence after the pair of cylinders 11*a*, 11*b*.

The transverse folds II and III are produced by the mechanism according to FIGURE 12 in the sense of FIGURES 6*a* and 6*b*. The subsequent folding process is effected by means of the suction channel 22, 23 and of the revolving segment 23. This is achieved in that the suction channel 22, 23 holds fast the leading lateral surface *a* of the blank 1 at the folded edge I, so that by virtue of the further transport of the lateral surface *b* of the bag, the Z-shaped fold with the folded edge II is formed, which is then flattened by the revolving segment 24.

Figure 14:
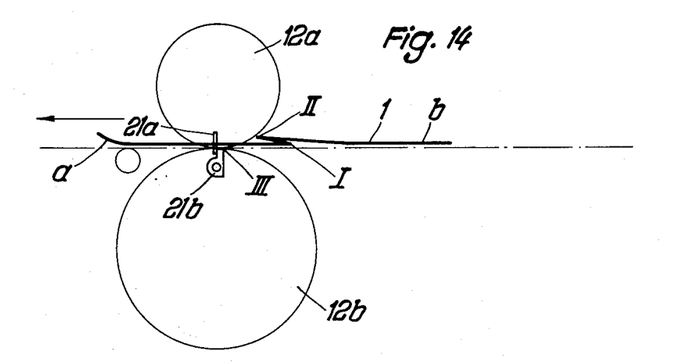
FIGURE 14 shows the last folding-blade and folding-gripper cylinder according to FIGURE 12 for performing the folding process according to FIGURE 6c.

In FIGURE 14 the first pair of folding-blade and folding-gripper cylinders 12*a*, 12*b* according to FIGURE 12 is shown separately. It is intended to explain here how the third transverse fold III is formed by the folding-blade 21*a* and the folding-gripper 21*b* at a distance from the fold I corresponding to the width of the bottom, so that finally, upon superimposition of the lateral surfaces *a* and *b* of the bag, a bag form is illustrated in FIGUE 6*c* is produced.

Figure 15:
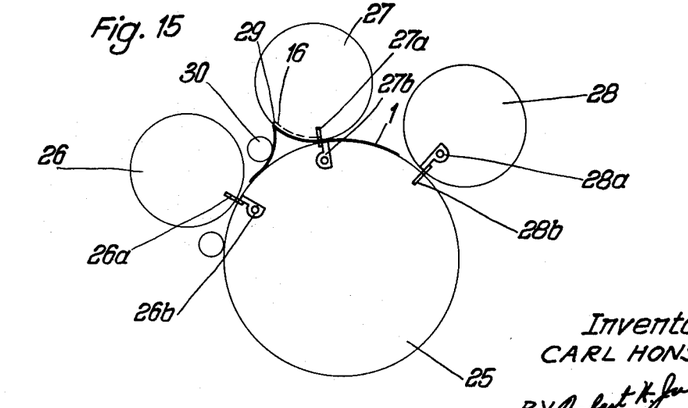
FIGURE 15 shows a third exemplary construction of a bottom-folding station having one main cylinder and three auxiliary cylinders cooperating with the said main cylinder.

Whereas in the case of the bottom folding station according to FIGURES 7 and 12, three pairs of folding-blade and folding-gripper cylinders are connected one behind another, the embodiment according to FIGURE 15 shows a main cylinder 25 to which three auxiliary cylinders 26, 27 and 28 are coordinated around the periphery of the main cylinder 25. The cylinder 28 is provided with a folding-gripper 28*a* which cooperates with a folding-blade 28*b* of the main cylinder 25. The auxiliary cylinder 27 is equipped with a folding blade 27*a* which cooperates with the folding-gripper 27*b* of the main cylinder, and finally the auxiliary cylinder 26 again has a folding-blade 26*a* which is required to cooperate with the folding-gripper 26*b* of the main cylinder 25. The central auxiliary cylinder 27 is again equipped with an air suction mechanism 29, and in addition, a deflector mechanism 30 is associated with the said auxiliary cylinder 27.

The embodiment according to FIGURE 15 differs from the embodiments of bottom folding stations already described hereinabove only in that, in order to economize in the overall length of the machine, the individual pairs of cylinders arranged one behind another which are otherwise required are replaced by three auxiliary cylinders (26, 27, 28) which cooperate with a main cylinder 25.

This machine for manufacturing block bottom bags with seamless bottoms operates solely by the use of revolving tools, and is so economical and permits such simple operation that the said machine may also, according to requirements, be constructed as a multiple-web machine, whereby of course the output capacity of the machine is further increased to a considerable extent. The conventional block bottom bag making machines, wherein the block bottom must be specially drawn up and glued, are so complicated that the construction of these machines as multiple-web machines is not a practical possibility.

Having now described my invention and its method of operation with reference to the embodiments illustrated in the drawings, I do not wish to be limited thereto, but what I desire to protect by Letters Patent of the United States of America is set forth in the appended claims.

I claim:

1. Method of manufacturing a block bottom bag having lateral folds disposed internally comprising the steps of feeding a web of material in longitudinal direction to a folding machine, providing a longitudinal fold and an adhesive along both edges of a longitudinal section prior to severing said section from said web of material, severing said section transversely of said longitudinal direction from the web to form a longitudinal blank, forming a first fold transversely of the direction of feed to produce a seamless bottom intermediate the portions constituting the sides of the bag, forming a second fold transversely of the direction of feed in a direction opposite to that of said first fold to impart a Z shape to said blank including said two transverse folds, forming a third fold transversely of the direction of feed and folding over one side along said last fold in a direction opposite to the direction of feed to superimpose one side on the other.

2. Method of manufacturing a block bottom bag having lateral folds disposed internally comprising the steps of feeding a web of material in longitudinal direction to a folding machine, providing a longitudinal fold and an adhesive along both edges of a longitudinal section prior to severing said section from said web of material, severing said section transversely of said longitudinal direction from the web to form a longitudinal blank, forming a first fold transversely of the direction of feed to produce a seamless bottom intermediate the portions constituting the sides of the bag, forming a second fold transversely of the direction of feed in a direction opposite to that of said first fold to impart a Z shape to said blank including said two transverse folds, forming a third fold transversely of the direction of feed and folding over one side along said last fold in a direction opposite to the direction of feed to superimpose one side on the other, said last fold having a folded edge coinciding with the edge of said second transverse fold.

3. Method of manufacturing a block bottom bag having lateral folds disposed internally comprising the steps of feeding a web of material in longitudinal direction to a folding machine, providing a longitudinal fold and an adhesive along both edges of a longitudinal section prior to severing said section from said web of material, severing said section transversely of said longitudinal direction from the web to form a longitudinal blank, forming a first fold transversely of the direction of feed to produce a seamless bottom intermediate the portions constituting the sides of the bag, forming a second fold transversely of the direction of feed in a direction opposite to that of said first fold to impart a Z shape to said blank including said two transverse folds, forming a third fold transversely of the direction of feed and folding over one side along said last fold in a direction opposite to the direction of feed to superimpose one side on the other, said last fold being disposed at a distance from said first fold corresponding to twice the distance between said first and said second fold.

4. Method of manufacturing a block bottom bag having lateral folds disposed internally comprising the steps of feeding a web of material in longitudinal direction to a folding machine, providing a longitudinal fold and an adhesive along both edges of a longitudinal section prior to severing said section from said web of material, severing said section transversely of said longitudinal direction from the web to form a longitudinal blank, forming a first fold transversely of the direction of feed to produce a seamless bottom intermediate the portions constituting the sides of the bag, forming a second fold transversely of the direction of feed in a direction opposite to that of said first fold to impart a Z shape to said blank including said two transverse folds, forming a third fold transversely of the direction of feed and folding over one side along said last fold in a direction opposite to the direction of feed to superimpose one side on the other, said Z shape being formed first and said third transverse fold being disposed ahead of said first fold in the direction of feed by a distance corresponding to twice the distance between said first and said second fold.

5. Machine for manufacturing block bottom bags having a block bottom folding station, said station comprising, in combination, folding tools including three folding blades each associated with a folding gripper, said blades and grippers being mounted on cylinders including three top cylinders arranged one behind the other and each carrying one said tool and a bottom cylinder carrying at least one said tool, the folding blade of the first pair of blade and gripper being arranged oppositely to the folding blades of the following two pairs of blade and gripper and means cooperating with the second pair of blade and gripper for imparting a fold forming movement to the leading part of a blank being formed by said tools, said pairs of blade and gripper being spaced in a manner that only one pair acts on a blank at any time.

6. Machine for manufacturing block bottom bags having a block bottom folding station, said station comprising, in combination, folding tools including three folding blades each associated with a folding gripper, said blades and grippers being mounted on cylinders including three top cylinders arranged one behind the other and each carrying one said tool and a bottom cylinder carrying at least one said tool, the folding blade of the first pair of blade and gripper being arranged oppositely to the folding blades of the following two pairs of blade and gripper and means cooperating with the second pair of blade and gripper for imparting a fold forming movement to the leading part of a blank being formed by said tools, said pairs of blade and gripper being spaced in a manner that only one pair acts on a blank at any time, said means for imparting a fold forming movement comprising an air suction device in the cylinder carrying said second folding blade and a deflector device.

7. Machine for manufacturing block bottom bags having a block bottom folding station, said station comprising, in combination, folding tools including three folding blades each associated with a folding gripper, said blades and grippers being mounted on cylinders including three top cylinders arranged one behind the other and each carrying one said tool and three bottom cylinders each carrying another said tool coordinated with a tool on an associated top cylinder, the folding blade of the first pair of blade and gripper being arranged oppositely to the folding blades of the following two pairs of blade and gripper and means cooperating with the second pair of blade and gripper for imparting a fold forming movement to the leading part of a blank being formed by said tools, said pairs of blade and gripper being spaced in a manner that only one pair acts on a blank at any time.

8. Machine for manufacturing block bottom bags having a block bottom folding station, said station comprising, in combination, folding tools including three folding blades each associated with a folding gripper, said blades and grippers being mounted on cylinders including three top cylinders arranged one behind the other and each carrying one said tool and one bottom cylinder carrying three other said tools each disposed to cooperate with a tool on one of said top cylinders, the folding blade of the first pair of blade and gripper being arranged oppositely to the folding blades of the following two pairs of blade and gripper and means cooperating with the second pair of blade and gripper for imparting a fold forming movement to the leading part of a blank being formed by said tools, said pairs of blade and gripper being spaced in a manner that only one pair acts on a blank at any time.

9. Machine for manufacturing block bottom bags comprising a block bottom folding station, said station comprising, in combination, three folding blade and three folding gripper cylinders arranged in pairs one behind another, the folding blade and folding gripper of the second pair of cylinders being arranged oppositely to the folding blades and grippers of said first and third pairs of cylinders, and a device following said second pair of cylinders including a rotating segment adapted to delay forming of the leading part of a blank until a first and second fold have been formed.

10. Machine for manufacturing block bottom bags comprising a block bottom folding station including three folding blade and three folding gripper cylinders arranged in pairs one behind another, the folding blade and folding gripper of the second pair of cylinders being arranged oppositely to the folding blades and grippers of said first and third pairs of cylinders, and a device following said second pair of cylinders including a rotating segment adapted to delay forming of the leading part of a blank until a first and second fold have been formed, said device adapted to delay forming of the leading part of said blank comprising a suction channel mounted in fixed position below the path of travel of said blank after said second pair of cylinders and a revolving segment disposed above said suction channel.

References Cited in the file of this patent
UNITED STATES PATENTS

| | | |
|---|---|---|
| 426,851 | Patterson | Apr. 29, 1890 |
| 1,713,243 | Swab | May 14, 1929 |
| 2,037,561 | Bossler et al. | Apr. 14, 1936 |
| 2,126,920 | Potdevin | Aug. 16, 1938 |
| 2,800,841 | Welsh | July 30, 1957 |
| 2,903,947 | Weisshuhn | Sept. 15, 1959 |
| 2,985,355 | Read | May 23, 1961 |

UNITED STATES PATENT OFFICE
CERTIFICATE OF CORRECTION

Patent No. 3,133,478         May 19, 1964

Carl Honsel

It is hereby certified that error appears in the above numbered patent requiring correction and that the said Letters Patent should read as corrected below.

In the grant (only), lines 2 and 3, and line 12, for "Karl-Heinz Housel", each occurrence, read -- Karl-Heinz Honsel --.

Signed and sealed this 3rd day of November 1964.

(SEAL)
Attest:

ERNEST W. SWIDER
Attesting Officer

EDWARD J. BRENNER
Commissioner of Patents